United States Patent
Inaishi et al.

(10) Patent No.: US 7,159,297 B2
(45) Date of Patent: Jan. 9, 2007

(54) METHOD OF MANUFACTURING A ROTOR OF AN ELECTRIC MOTOR

(75) Inventors: Shingo Inaishi, Gamagori (JP); Shinya Ishikawa, Nishio (JP); Hirotsugu Douba, Takahama (JP); Ryuichi Kanbe, Handa (JP)

(73) Assignee: Denso Corporation, Kariya (JP)

( * ) Notice: Subject to any disclaimer, the term of this patent is extended or adjusted under 35 U.S.C. 154(b) by 447 days.

(21) Appl. No.: 10/797,597

(22) Filed: Mar. 11, 2004

(65) Prior Publication Data

US 2004/0187294 A1    Sep. 30, 2004

(30) Foreign Application Priority Data

Mar. 11, 2003 (JP) .............................. 2003-065722
Feb. 24, 2004 (JP) .............................. 2004-048368

(51) Int. Cl.
*H02K 15/02* (2006.01)
*H02K 15/10* (2006.01)

(52) U.S. Cl. .............................. 29/598; 29/596; 29/605; 29/606; 29/609; 29/732; 29/738; 177/25.14; 177/50

(58) Field of Classification Search .................. 29/598, 29/596, 605, 606, 609, 732, 738; 177/25.14, 177/50
See application file for complete search history.

(56) References Cited

U.S. PATENT DOCUMENTS 3,736,997 A * 6/1973 Bottorf ....................... 177/145

| 4,835,839 A | 6/1989 | Forbes et al. |
| 5,174,009 A * | 12/1992 | Martin ....................... 29/564.6 |
| 5,365,021 A | 11/1994 | Neuenschwander |
| 6,092,278 A * | 7/2000 | Latkow ....................... 29/609 |
| 2002/0130583 A1 | 9/2002 | Moroto et al. |

FOREIGN PATENT DOCUMENTS

JP    62-244256    10/1987
JP    11-252872    9/1999

* cited by examiner

*Primary Examiner*—A Dexter Tugbang
*Assistant Examiner*—Tim Phan
(74) *Attorney, Agent, or Firm*—Nixon & Vanderhye P.C.

(57) ABSTRACT

It is an object of the present invention to provide a method of manufacturing a rotor for an electric motor, in which displacement of the center of gravity is prevented. According to a feature of the present invention, a rotor for an electric motor comprises an inner core fixed to a rotating shaft of the rotor and multiple coil units respectively fixed to the inner core, wherein the coil unit has an outer core, a bobbin and a winding wound on the bobbin, and wherein weight of outer cores as well as winding units (the bobbin and the winding wound thereon) is respectively measured and stratified into several groups, necessary number of the outer cores and winding units are respectively picked out from the same stratified group and then such outer cores and winding units are assembled to the inner core.

3 Claims, 15 Drawing Sheets

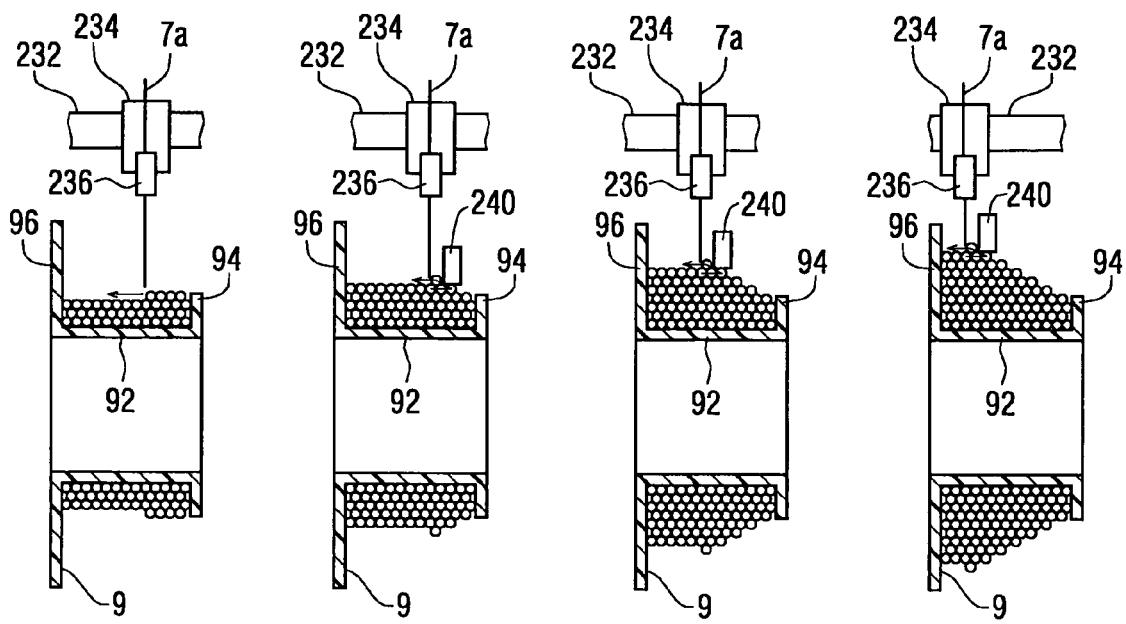
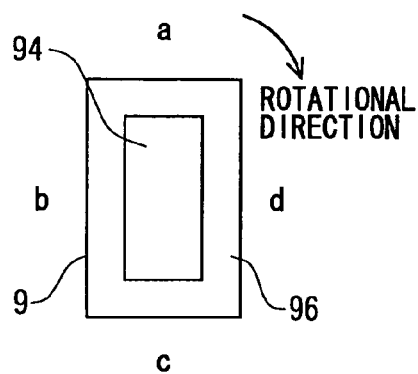
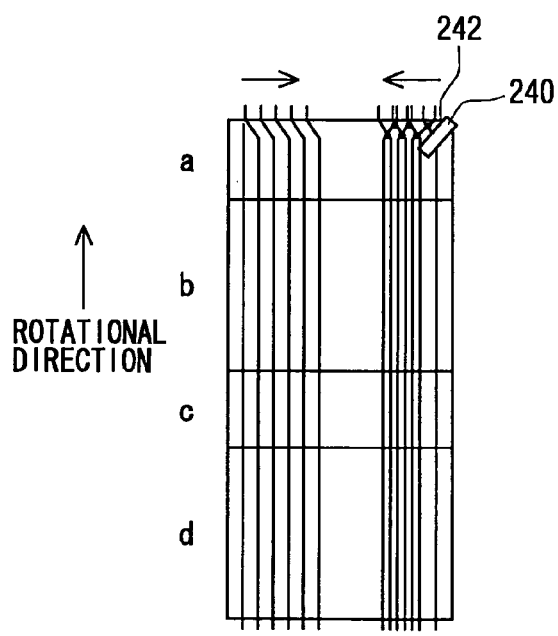

METHOD OF MANUFACTURING A ROTOR OF AN ELECTRIC MOTOR

CROSS REFERENCE TO RELATED APPLICATION

This application claims priority to JP Application No. 2003-65722, filed 11 Mar. 2003 and JP Application No. 2004-48368 filed 24 Feb. 2004. The entire contents of this application are incorporated herein by reference.

FIELD OF THE INVENTION

The present invention relates to a method of manufacturing a rotor for an electric motor, in particular relates to a manufacturing method of a rotor for a fuel pump for an internal combustion engine.

BACKGROUND OF THE INVENTION

It is well known in the prior art that an inner core and multi outer cores are separately manufactured and the outer cores are fixed to the inner core to form a rotor of an electric motor, wherein winding units (a bobbin and a winding wound thereon) are respectively formed on the outer cores. In such a prior art rotor, the outer cores are made of laminated metal sheets and the outer cores with the winding units are arranged at equal intervals in a circumferential direction.

There are, however, many kinds of manufacturing variations (e.g. weight variations) in the method of manufacturing the rotor of the above type. For example, the weight variations appear in the cores due to variations of press dies or a machine for laminating punch-out core pieces. The weight variations also appear in the winding units, because number of winding turns differ from each other among the adjacent winding units.

In the prior art rotor, in which the inner core and the outer cores are separately manufactured and then assembled together, there may be a problem of a lock of the rotor to be caused by the weight variations, when a center of gravity of the rotor is displaced during a rotation thereof.

In order to avoid such a problem, it is possible to adjust weight imbalance of the rotor by adding a plummet or cutting a portion of the rotor. However, it becomes higher in a manufacturing cost. Furthermore, in case of the fuel pump, pulsation may likely occur in a flow of fuel when the plummet is attached to an outer peripheral surface of the rotor or a portion of the outer periphery is cut away.

SUMMARY OF THE INVENTION

In view of the above problem, it is an object of the present invention to provide a method of manufacturing a rotor for an electric motor, in which displacement of the center of gravity is prevented.

It is another object of the present invention to provide a method of manufacturing a rotor of an electric motor, according to which weight variations of the outer cores, the bobbins and windings are made smaller and adjustments for the weight imbalances are substantially not necessary.

It is a further object of the present invention to provide a method of manufacturing a rotor of an electric motor, according to which a lamination factor of the windings is increased.

It is a further object of the present invention to provide a method of manufacturing a rotor of an electric motor, according to which number of intermediate stocks can be reduced to increase productivity.

According to one of the features of the present invention, an electric motor has a rotor rotationally supported by a motor housing, and the rotor comprises an inner core fixed to a rotating shaft of the rotor and multi coil units respectively fixed to the inner core, wherein the coil unit has an outer core, a bobbin and a winding wound on the bobbin, and wherein a method of manufacturing the rotor comprises the steps of:

a step of measuring weight parameter of at least one of the outer cores, bobbins and windings;

a step of stratifying at least one of the outer cores, bobbins and windings depending on the weight parameter into a predetermined number of groups, wherein each of the groups has a weight parameter range;

a step of preparing a set of coil units, which has a certain number of outer cores, bobbins and windings, wherein at least one of outer cores, bobbins and windings are picked out from one of the stratified groups; and a step of assembling the set of coils unit to the inner core.

It is preferable to stratify such one of the outer cores, bobbins and windings, which has a wider range of weight variations than those of the other two of them.

BRIEF DESCRIPTION OF THE DRAWINGS

The above and other objects, features and advantages of the present invention will become more apparent from the following detailed description made with reference to the accompanying drawings. In the drawings:

FIGS. 11A to 11D are schematic views showing a winding process;

FIGS. 12A and 12B are drawings showing turning points of wire during the winding process;

FIGS. 19A and 19B are graphs showing frequency distribution with respect to weights of the coil units, wherein FIG. 19B is a graph for a modification;

DETAILED DESCRIPTION OF THE PREFERRED EMBODIMENTS

An embodiment of the present invention is explained with reference to the drawings. At first, a structure of an electric motor will be described with reference to FIGS. 1 to 3.

Figure 1:
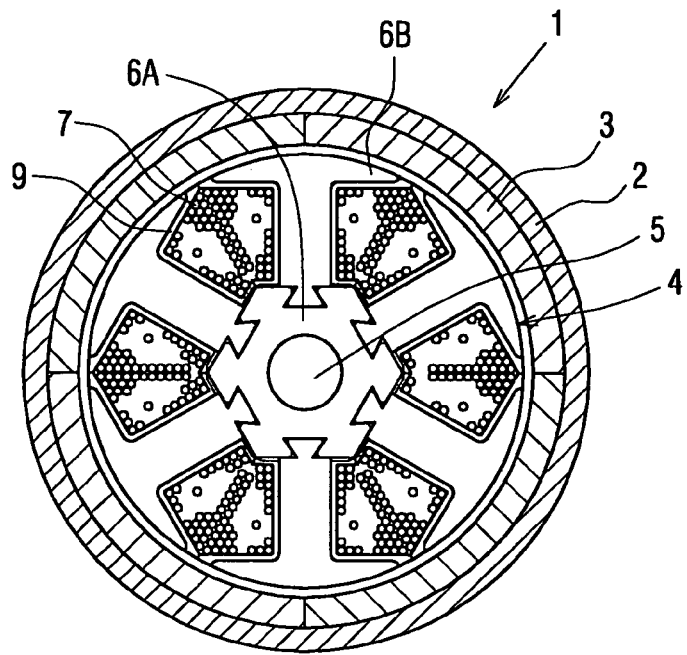
FIG. 1 is a schematic cross-sectional view showing an electric motor according to a first embodiment of the present invention.

An electric motor 1 according to an embodiment of the present invention is used, for example, as a power source for an electric fuel pump installed in a motor vehicle. As shown in FIG. 1, the electric motor 1 comprises a cylindrical yoke 2, permanent magnets 3 disposed at the inner periphery of the yoke 2, and a rotor 4 disposed inside of the permanent magnets 3 and rotationally supported by a motor housing (the yoke 2).

The yoke 2 (hereinafter also referred to as the housing) forms a magnetic circuit for a magnetic field, and forms the housing of the electric motor 1.

Four permanent magnets 3 are, for example, used here and magnetized at S-pole and N-pole alternately so that magnetic poles of adjacent magnets in a circumferential direction are different from each other.

Figure 2A:
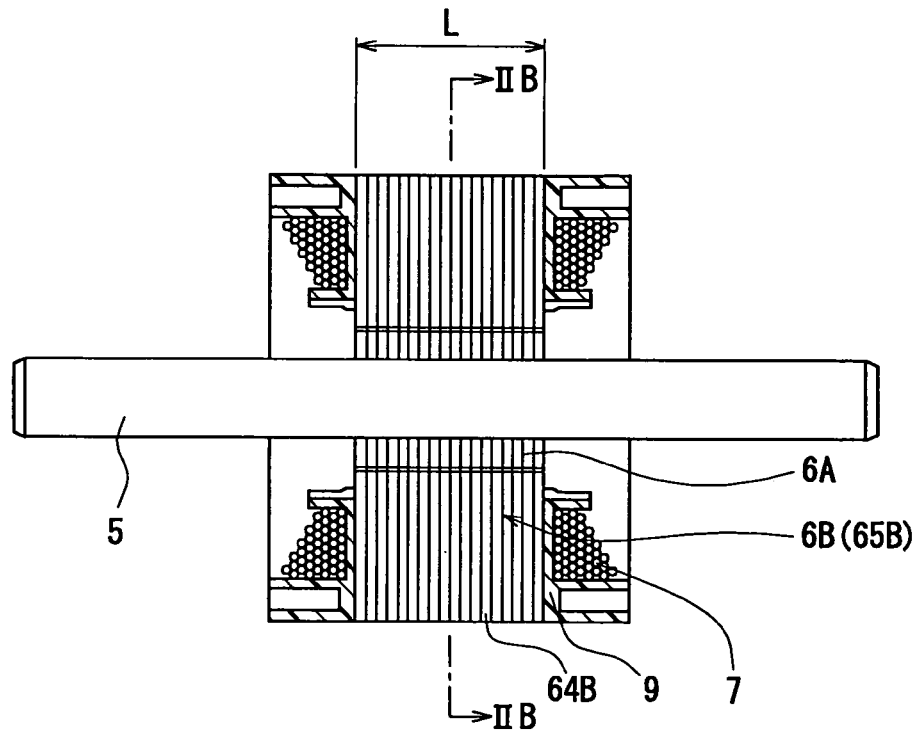
FIG. 2A is a schematic cross-sectional view taken along a line IIA—IIA in FIG. 2B and showing a rotor of the first embodiment.
Figure 2B:
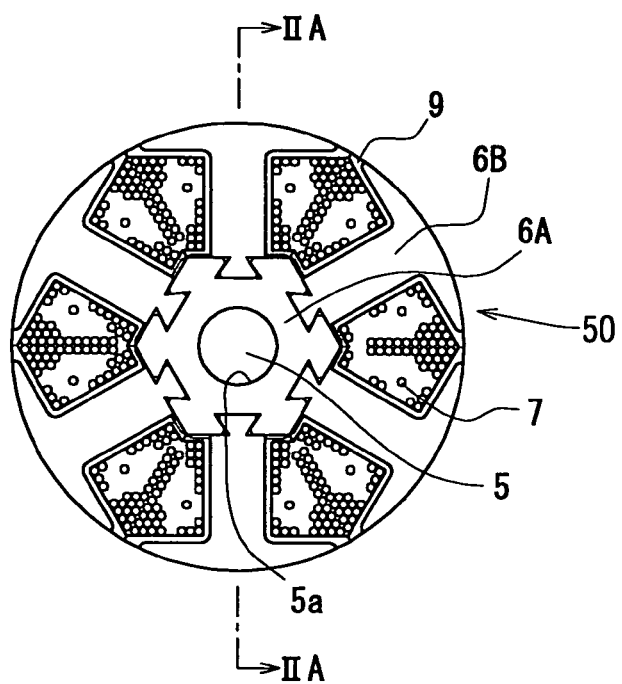
FIG. 2B is a schematic cross-sectional view taken along a line IIB—IIB in FIG. 2A.

The rotor 4 (also referred to as an armature) comprises a rotating shaft 5, a core 6 and a winding 7 as shown in FIGS. 2A and 2B.

Figure 3:
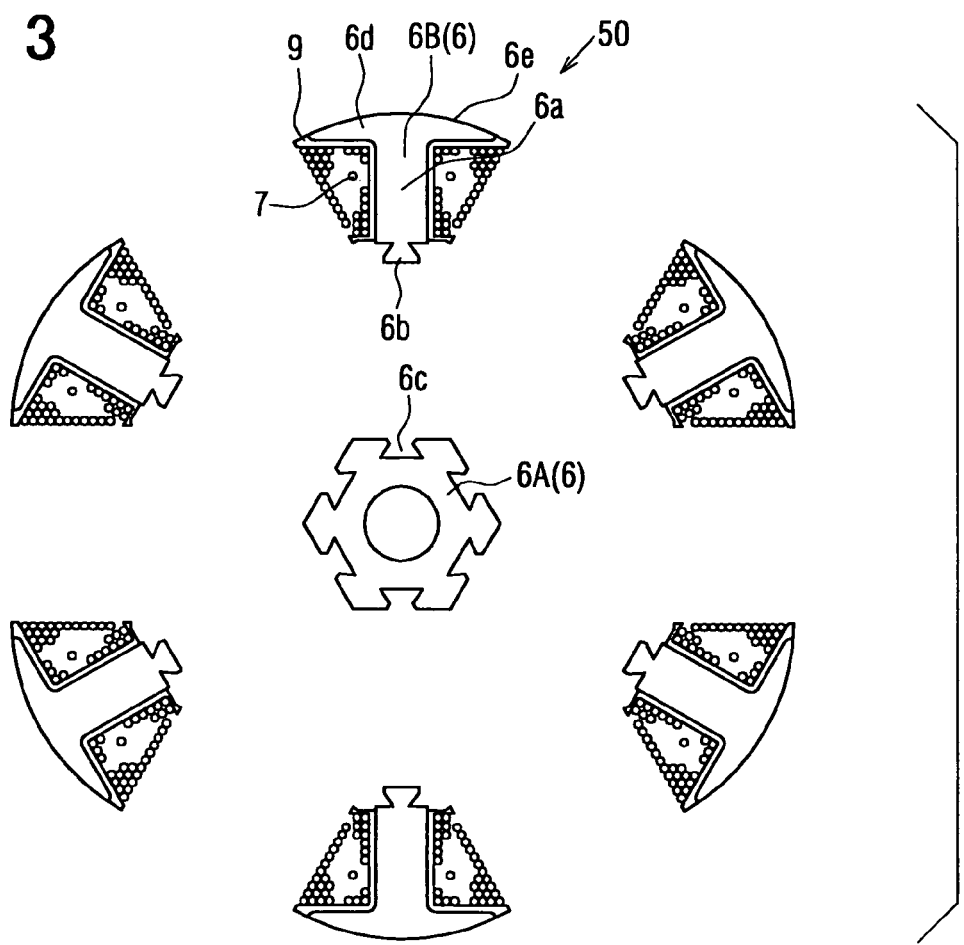
FIG. 3 is a schematic development view showing the rotor in FIG. 2B.

The core 6 comprises an inner core 6A at a center of rotation and multiple outer cores 6B (six cores in the embodiment), as shown in FIGS. 2B and 3. The core 6 are divided into two groups in a radial direction, namely one inner core 6A and six outer cores 6B, wherein they are separately and independently manufactured and then assembled to form one unit. The rotating shaft 5 is press-inserted into a central bore 5a of the inner core 6A.

Each of the inner and outer cores 6A and 6B is composed of laminated layer of sheet metal, which is punched out from metal sheet. The metal sheet is made of magnetic material and has a thickness of 0.2 to 1.0 mm, and each of the cores is formed by laminating several tens of the punched out sheet metal. In this embodiment, the metal sheet has a thickness of 0.5 mm and 18 metal sheet are laminated. In stead of the laminated core, the inner and outer cores 6A and 6B can be made by other methods, such as cutting.

As shown in FIG. 3, the outer core 6B is of a T-shape and has a tooth portion 6a, a connecting portion 6b at an inner end of the tooth portion 6a and a periphery portion 6d at an outer end of the tooth portion 6a and extending in a peripheral direction. The inner core 6A is of a hexagon shape and is provided at its outer periphery with multiple (six in this embodiment) concaves 6c connectable with the connecting portion 6b of the outer cores 6B.

6 sets of coil units 50 are fixed to the inner core 6A, wherein the coil unit 50 is composed of the outer core 6B, a bobbin 9 made of an insulating material, such as resin, and a winding 7 wound on the bobbin 7. 6 sets of the coil units 50 are arranged at such positions of circumferentially equally spaced.

The bobbin 9 covers the outer core 6B except for the connecting portion 6b, the periphery portion 6d and a peripheral surface 6e. An outer end of the bobbin 9 is made larger than a circumferential length of the periphery portion of the outer core 6B, so that when 6 sets of the coil units 50 are assembled and fixed to the inner core 6A to form the rotor 4, each of the side ends of the outer core 6B is spaced from the adjacent side ends of the other outer cores 6B. Accordingly, each of the periphery portions 6d is magnetically insulated from the adjacent periphery portions 6d. Each of the peripheral surface 6ehas a circular arc, so that it forms a circular outer surface after 6 sets of the coil units 50 are assembled to the inner core 6A, and the rotor 4 is rotationally supported in the motor housing in such a way that the circular outer surface of the rotor 4 is equally spaced from the inner surface of the permanent magnets 3.

The bobbin 9 has a trapezoidal winding space in its longitudinal cross-section and formed by a first (small) flange 94, a second (large) flange 96 larger than the first flange 94 and a rectangular hollow base 92 having the first and second flanges at its ends, so that a height of the trapezoidal winding space becomes higher in a direction from the first to the second flange.

A wire 7a is wound on the bobbin 9 to form the winding 7, wherein the number of winding turns is made larger towards the second flange 96 so that the cross-section of the winding 7 also becomes the trapezoidal configuration. An open angle of the winding 7 is made to be 60 degree in its cross-section in this embodiment, so that the bobbin 9 and the winding 7 are assembled to the inner core 6A in which adjacent ends of the bobbins 9 and the windings 7 closely (without space therebetween) contact with each other.

It is not necessary to form the winding 7 in a conventional manner, in which a wire is inserted into slots formed by adjacent outer cores and wound thereon directly or on bobbins provided on the outer cores. According to the present embodiment, the winding 7 is at first formed on the bobbin 9, the outer core 6B is inserted into the bobbin 9, and then the outer core 6B is fixed to the inner core 6A together with the bobbin 9 and the winding 7, so that the adjacent windings 7 are closely contacted with each other to increase a lamination factor.

A manufacturing process for the rotor 4 of the electric motor 1 will be explained with reference to FIG. 4. The process comprises a first process 300 for manufacturing the laminated outer core 6B, a second process 400 for manufacturing the bobbin 9 and winding 7, and a third process 500 for assembling the coil units 50 (the outer cores 6B, the bobbin 9 and the winding 7) to the inner core 6A.

(The First Process 300)

The first process 300 of manufacturing the outer cores 6B comprises a press forming step 310 and an outer core grouping step 320. In the press forming step 310, the outer cores 6B are made from the metal sheet by a punch-out process and a predetermined number of the punched-out sheet metal are laminated. In the outer core grouping step 320, a length of the laminated outer core 6B in its longitudinal direction (a laminated length) as well as the weight thereof is measured and divided into the respective groups in accordance with the measured laminated length and weight.

Figure 5:
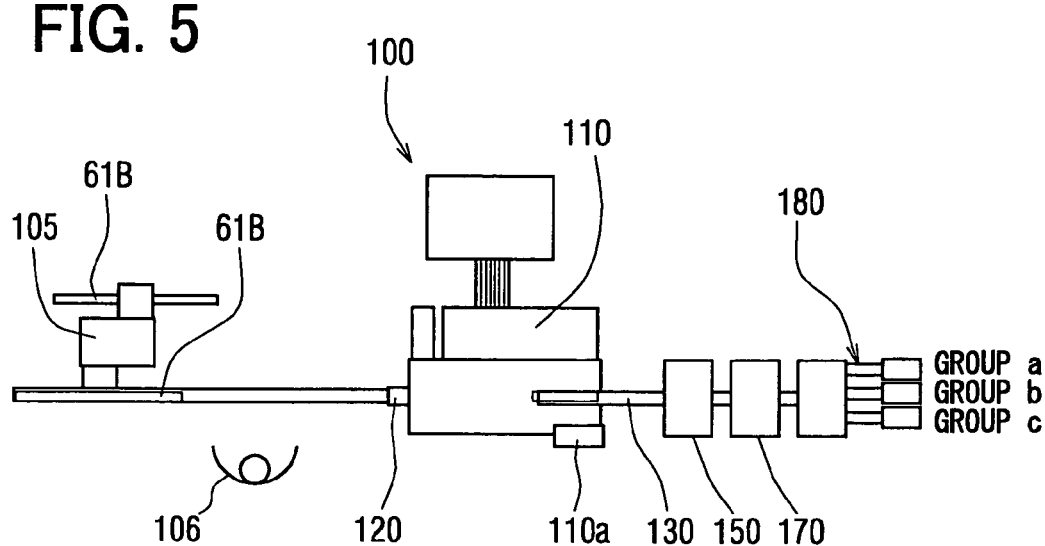
FIG. 5 is a schematic view showing an apparatus for manufacturing laminated outer cores.

An outer core manufacturing apparatus 100 is shown in FIG. 5, which comprises a material feeding machine 105, a material transferring machine 120, a press forming machine 110, a work transferring machine 130, a core laminating machine 150, a measuring machine 170 and a grouping machine 180.

The material feeding machine 105 feeds a metal sheet 61B for the outer core 6B to the material transferring machine 120. The metal sheet 61B is a rolled steel sheet of magnetic material and one roll constitutes one lot. Since the metal sheet 61B of one roll has a uniform thickness, the thickness of the metal sheet is measured when the roll is changed. This measurement can be done by a worker 106 or by an automatic thickness measuring machine (not shown) so that thickness of the metal sheet is automatically measured whenever a new material (new roll) comes to the thickness measuring machine. In this embodiment, however, the worker 106 measures the thickness and inputs the measured thickness to a control unit 110a, so that the control unit 110a decides the necessary number of the lamination in accordance with the measured thickness.

The material transferring machine 120 transfers the metal sheet 61B from the material feeding machine 105 to the press forming machine 110, wherein the transferring speed is controlled so that the metal sheet 61B is transferred to the press forming machine 110 depending on the working speed of the press forming machine 110.

At the press forming machine 110, the metal sheet 61B is punched out to make pieces (works) of the outer core 6B (an outer core piece 64B in FIGS. 6A and 6B), which will be then transferred to the work transferring machine 130. The work transferring machine 130 is a well known machine, for example, a belt conveyer and transfers the works (the outer core pieces) to the core laminating machine 150.

Figure 6A:
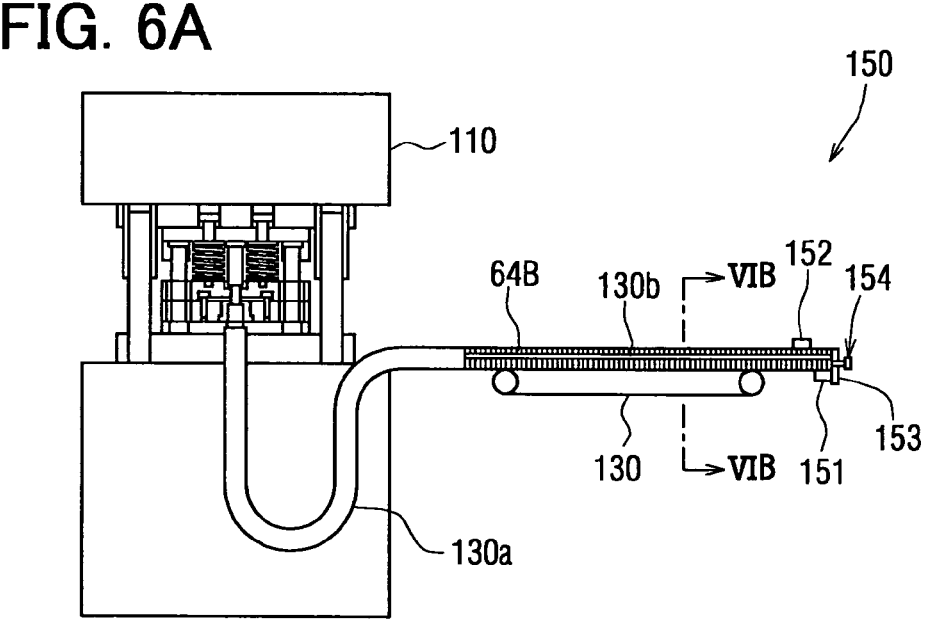
FIG. 6A is a schematic view showing a work transferring machine.
Figure 6B:
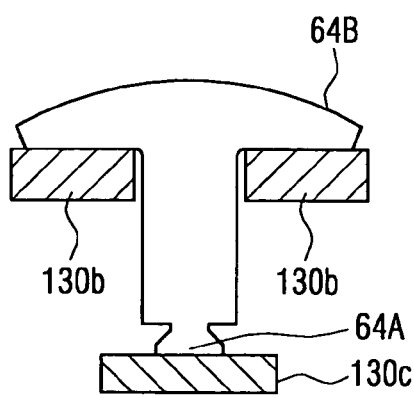
FIG. 6B is a schematic cross-sectional view taken along a line VIB—VIB in FIG. 6A and showing an outer core piece and a part of the work transferring machine.

As shown in FIGS. 6A and 6B, the work transferring machine 130 comprises a carrying shoot 130a for shooting the outer core pieces 64B towards a belt 130c, at which the outer core pieces 64B are guided by a pair of carrying rails 130b and a lower end 64A of the piece 64B is contacted with the belt 130c. Since the belt 130c is moving towards the core laminating machine 150, the outer core pieces 64B will be also moved forwardly by the movement of the belt 130c while being supported by the rails 130b. As seen from FIG. 6A, the outer core pieces 64B are forming a line of outer core pieces guided by the rails 130b.

Figure 7A:
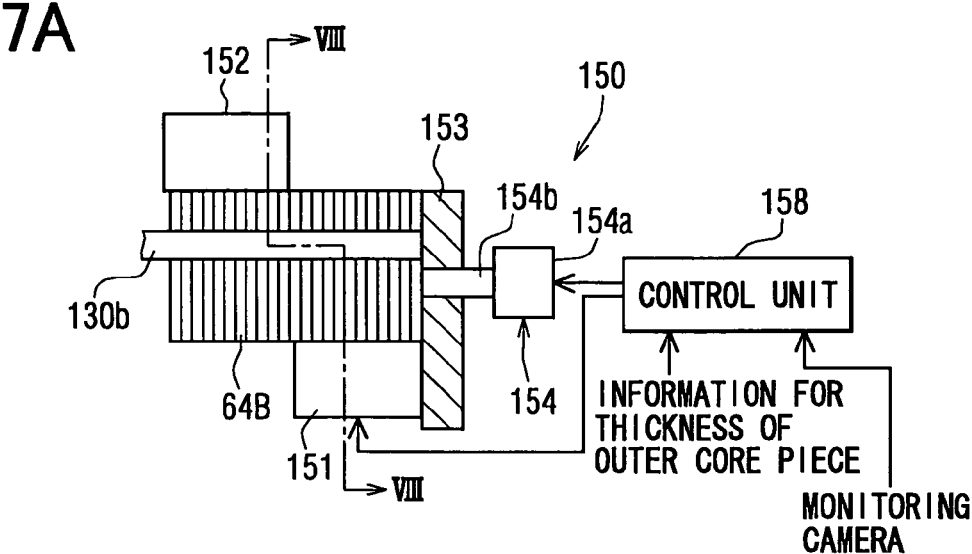
FIGS. 7A to 7C are schematic views showing a core laminating machine.
Figure 7B:
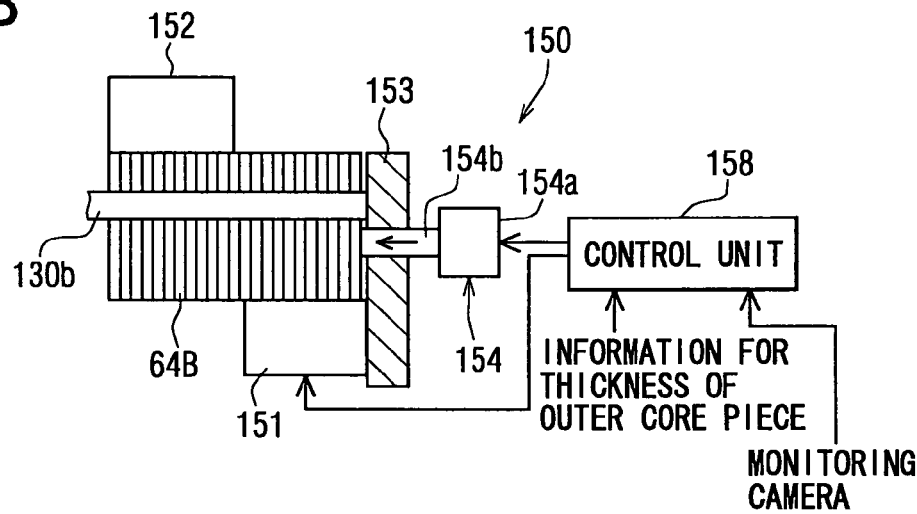
Figure 7C:
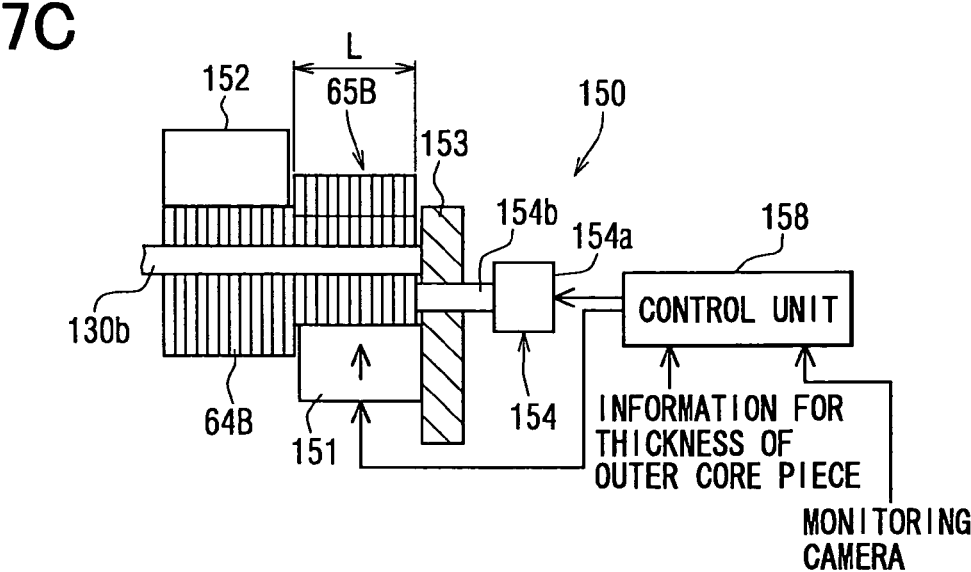

A major portion of the core laminating machine 150 is shown in FIGS. 7A to 7C, in which a stopper portion 153 is connected to and supporting the carrying rails 130b, so that a front end of the line of the outer core pieces 64B is contacted with the stopper portion 153. The core laminating machine 150 further comprises a push-out portion 151, a receiver portion 152, an adjusting device 154 having a driving portion 154a and a movable shaft 154b, and a lamination control unit 158, wherein a signal for the thickness of the outer core pieces 64B (the metal sheet 61B), or the signal from the control unit 11a for the necessary number of the lamination, as well as a signal from a monitoring camera 157 (shown in FIG. 8) is input to the lamination control unit 158.

Figure 8:
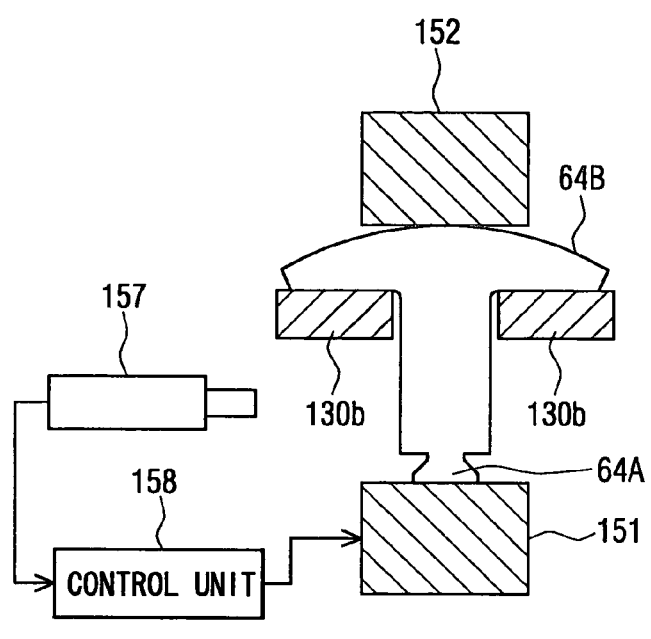
FIG. 8 is a schematic view and a cross-sectional view partly showing the core laminating machine.
Figure 9:
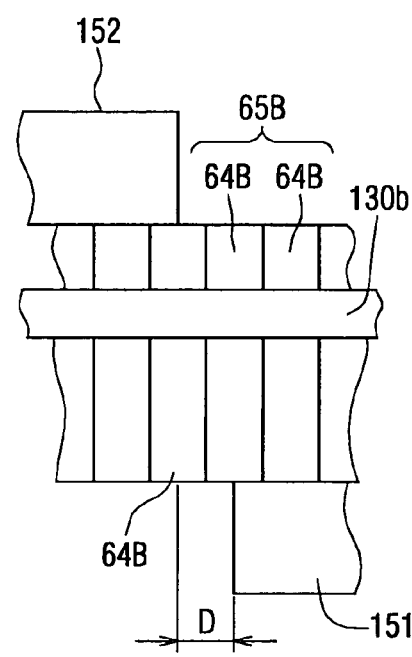
FIG. 9 is a cross-sectional view taken along a line IX—IX in FIG. 8.

As more clearly understood from FIG. 8 and FIG. 9, the push-out portion 151 and the receiver portion 152 are arranged at the opposite sides of the outer core piece 64B, and a left-hand end of the push-out portion 151 and a right-hand end of the receiver portion 152 are offset by a distance D (in FIG. 9) in a longitudinal direction of the line of the outer core pieces 64B, wherein the distance D is selected to be the one between a thickness of one outer core piece 64B and a thickness of two outer core pieces 64B. Since the push-out portion 151 is movable in a direction towards the carrying rails 130b, a certain number of the outer core pieces 64B, which are in contact with the push-out portion 151 at their lower ends 64A, are moved upwardly in the drawing and push out from the carrying rails 130b, when the push-out portion 151 moves upwardly.

Back to FIGS. 7A to 7C, the movable shaft 154b is movably supported by the stopper portion 153 and moves back and forth by the driving portion 154a, which is controlled by the lamination control unit 158. The control unit 158 drives the driving portion 154a in accordance with the signal for the thickness of the metal sheet, so that a required number of the outer core pieces 64B are in contact with the push-out portion 151.

In this operation, the control unit 158 controls the movement of the movable shaft 154b so that a center of the outer core piece 64B at the back end of a set 65B comes into an alignment with the left-hand end of the push-out portion 151, as shown in FIG. 9. And in the same manner, a center of the outer core piece 64B at a front end of another set comes into an alignment with the right-hand end of the receiver portion 152. Accordingly, the set 65B of the outer core pieces 64B having a laminated length L is obtained. As understood from FIG. 9, when the set 65B of the outer core pieces 64B is taken out from the core laminating machine 150, it is prevented that the outer core piece 64B at the back end of the set 65B will be caught between the push-out portion 151 and the receiver portion 152 and that the outer core piece 64B at the front end of the other set is upwardly moved with the set 65B.

The monitoring camera 157 is positioned at a place where it can watch the end of the set 65B of the outer core pieces 64B, so that so long as the lamination control unit 158 recognizes based on the signal from the monitoring camera 157 that there is the outer core pieces 64B at the end of the set 65B, the control unit 158 outputs a control signal to a driving device (not shown) so that the push-out portion 151 will be moved upwardly.

The laminated outer cores 65B will be then transferred to the measuring machine 170, at which the laminated length L and the weight of the laminated outer cores 65B will be measured by a length detecting device (not shown) and a weight detecting device (not shown).

Depending on the detected length and weight of the laminated outer cores 65B, the respective sets of the laminated outer cores 65B will be divided into a certain number of groups (in this embodiment, three groups a to c) by the grouping machine 180. Accordingly, the sets of the laminated outer cores 65B in the respective groups respectively have the weights within a predetermined range of the weights.

(The Second Process 400)

Referring back to FIG. 4, the second process 400 will be explained. The second process comprises a mold-forming step 410 for the bobbin 9, a winding step 420 for forming the winding 7 on the bobbin 9 and a winding unit grouping step 430 for measuring the weight of the winding unit (the bobbin 9 with the winding 7).

At the mold-forming step 410, the bobbin 9 is formed by molding process so that the inside rectangular hollow space is made to house therein the laminated outer cores 65B in a close contact manner.

At the winding step 420, the wire will be wound on the bobbin 9 in a symmetric form with respect to an axis of the rectangular hollow base 92, the details of which will be explained with reference to FIGS. 10A to 13.

Figure 10A:
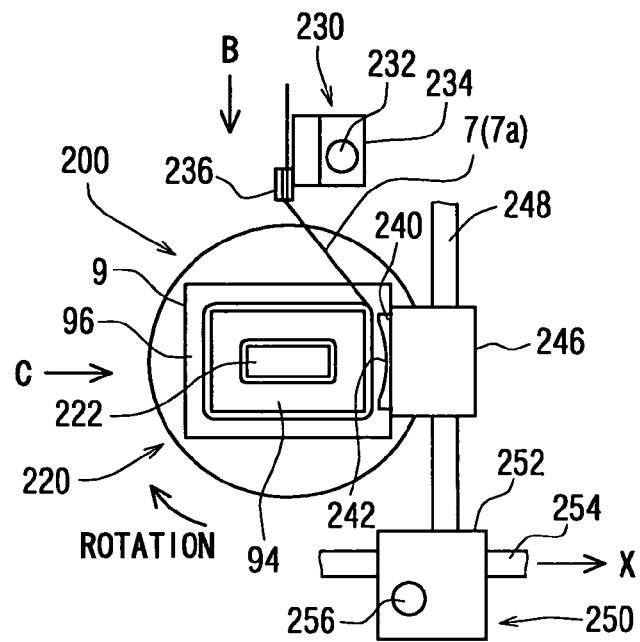
FIGS. 10A to 10C are a front view and side views showing a wire winding machine.
Figure 10B:
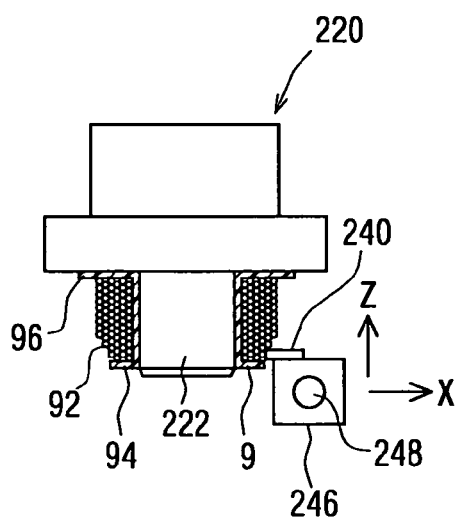
Figure 10C:
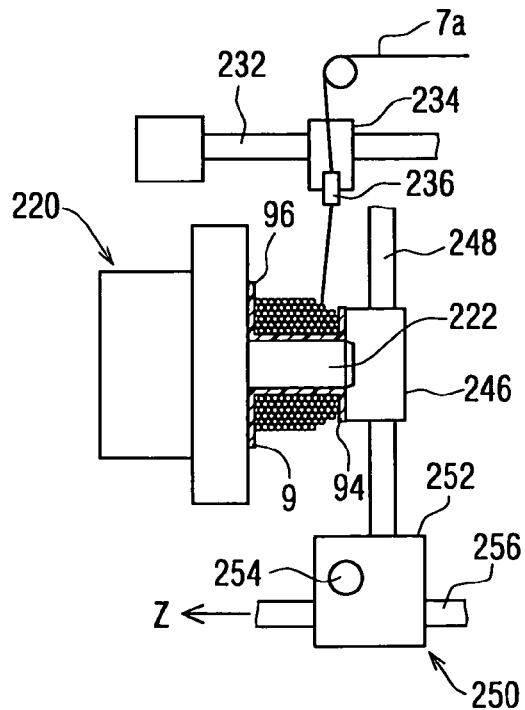
Figure 13:
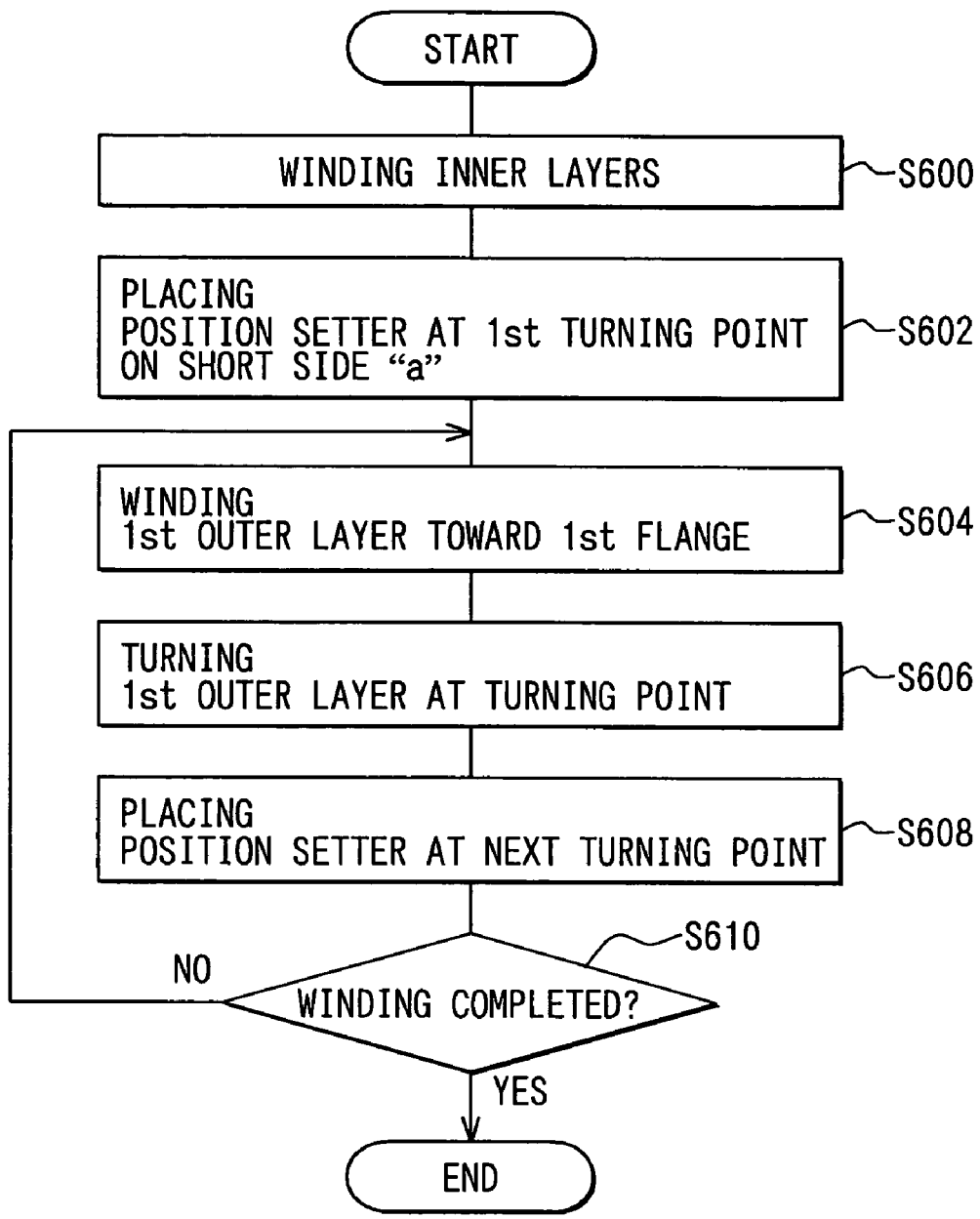
FIG. 13 is a flow-chart showing the steps for the winding process.

A winding apparatus 200 includes a spindle 220 for rotating the bobbin 9, a wire feeder 230, a position setter 240 and a moving device 250, as shown in FIGS. 10A to 10C. Both of the first flange 94 and the second flange 96 are rectangular plates connected to the rectangular hollow base 92, and the bobbin 9 is inserted to a spindle shaft 222 of the spindle 220, which also has a rectangular cross section.

The wire feeder 230 includes a shaft 232, a holder 234 supported by the shaft 232 and a feeder nozzle 236 connected to the holder 234. The holder 234 slidably moves on the shaft 232 in a a direction parallel to the center axis of the bobbin 9. The holder 234 is reciprocated back and forth on the shaft 232 by a mechanism such as a driving screw. A wire 7a to be wound in the winding space of the bobbin 9 is fed from the feeder nozzle 236. One end of the wire 7a is connected to the spindle 220, and the wire 7a fed from the feeder nozzle 236 is wound around the rectangular hollow base 92 of the bobbin 9 when the spindle 220 is rotated and the feeder nozzle 236 moves back and forth (in direction Z in FIG. 10C).

The position setter 240 is held by a holder 246 that is connected to a shaft 248. The holder 246 connected to the shaft 248 is driven in both directions X and Z (shown in FIG. 10B) by a supporter 252 of the moving device. The supporter 252 is slidably coupled to a shaft 254 extending in direction X and another shaft 256 extending in direction Z by a mechanism of a driving screw. In this manner, the position setter 240 having a guide surface 242 for guiding the wire 7a is movable in both the axial direction (direction Z) and the direction (direction X) perpendicular to the axial direction.

The position setter 240 regulates turning points of the winding wire 7a, the winding point of which moves back and forth between the second flange 96 and the position setter 240, after inner layers of the winding 7 reaches a height of the first flange 94. The position setter 240 further regulates the amount of the displacement of the wire 7a at the turning points.

Referring to FIGS. 11A to 13, an operation of the winding apparatus 200 will be described. As shown in FIG. 11A, the wire 7a is guided back and forth in direction Z by the feeder nozzle 236, so that inner layers of the winding 7 are wound in a space between the first flange 94 and the second flange 96 until the inner layers reach a height of the first flange 94. (A step S600 in FIG. 13) As shown in FIG. 11B, the position setter 240 is then moved to a first turning point before a winding point for the inner layer comes back from the second flange 96 to the first flange 94, so that the winding point turns at the first turning point to form outer layers of the winding 7. (A step S602 in FIG. 13)

The wire 7a is further wound on the bobbin 9 towards the second flange 96 and the winding point will be turned at the second flange 96 so that the wire 7a will be wound towards the first flange 94. (A step S604 in FIG. 13)

As shown in FIG. 11C, the position setter 240 is further moved to a second turning point, so that the winding point will be turned at the second turning point which is closer to the second flange 96 than the first turning point by two pitches of the wire 7a. (A step S606 in FIG. 13)

In the same manner to the above step S606, the position setter 240 is further moved towards the second flange 96 and placed at another (third) turning position. (A step S608 in FIG. 13)

As shown in FIGS. 11C and 11D, this process (the steps S604, S606 and S608) is repeated until the outer layers of the winding 7 completely fill the upper layer space. (A step S610 in FIG. 13) In this manner, the wire 7a is wound to fill the entire trapezoidal winding space, thereby forming the winding 7.

As shown in FIG. 12A, the rectangular bobbin 9 has a pair of short sides "a" and "c", and a pair of long sides "b" and "d". The position setter 240 having the guide surface 242 slanted as shown in FIG. 12B smoothly guides the wire 7a during the winding process. The position setter 240 sets the respective turning points of each outer layer, so that the number of turns in each outer layer is gradually reduced by a predetermined number of turns. In this particular embodiment, two turns are reduced layer by layer. In other words, the right side end of each outer layer is shifted toward the large flange 96 by two-wire-pitches. FIG. 12B shows an exploded view of the four sides a–d of the bobbin 9. As shown in FIG. 12B, the turning points of all outer layers are set on the short side "a". At each turning point, the wire 7a crosses over the wire 7a of a lower layer.

As described above, according to the winding machine 200 and the winding process, the wire is wound on the bobbin 9 to form the inner layers of the winding until it reaches the height of the first flange 94, wherein the winding point moves back and forth between the first and second flanges 94 and 96. Then, the wire is further wound on the inner layers to form the outer layers of the winding, wherein the winding point moves back and forth between the second flange 96 and the position setter 240 and the distance between the second flange 96 and the position setter 240 is gradually decreased. In this winding process, since the turning points of the winding points are defined by the position setter 240, the winding operation can be done without reducing the winding speed and the displacement of the wire at the turning points is prevented. As above, the winding 7 is made at a high winding speed and the weight variations of the bobbins 9 with the winding 7 can be made smaller so that a grouping operation at a later step 430 can be made easier.

Furthermore, according to the winding machine 200 and the winding process, the winding 7 is formed into line and thereby a length of the wire can be made almost the same among the windings. Since the weight variations of the windings 7 (together with the bobbins 9) can be made smaller, the coil units (comprising the outer cores 6B, the bobbins 9 and the windings 7) having the almost same weights can be assembled to the inner core 6A, by grouping the outer cores 6B by their weights.

Furthermore, according to the winding machine 200 and the winding process, the turning points of the winding points are defined by the position setter 240, namely the turning points are placed at almost the same position in the circumferential direction to reduce the displacement of the turning points. As a result, the winding units (the winding 7 and the bobbins 9) stratified into the respective groups at the step 430 have smaller variations with respect to the center of gravity.

Referring back again to FIG. 4, after the wire is wound on the bobbin 9 at the step 420, the weight of the winding unit (the bobbin 9 and the winding 7 wound thereon) will be measured and divided into a predetermined number of groups. The weights of the winding units in the respective groups are controlled at certain different ranges of the weights.

(The Third Process 500)

The third process 500 is the process for assembling the winding units (the bobbin 9 and the winding 7) to the laminated outer core 6B and finally to the inner core 6A. At a step 510, a necessary number (6 in this embodiment) of laminated outer cores 6B is picked out from one of the groups and likewise the same number of the winding units is picked out from one of the groups, to prepare 6 sets of the coil units (6 laminated outer cores 6B and 6 winding units) for assembling them to the inner core 6A.

As described above already, the laminated outer cores 6B as well as the winding units (the bobbin 9 and the winding 7) are respectively stratified into several groups depending on the weights thereof, wherein the laminated outer cores 6B (as well as the winding units) belonging to the same group are controlled that the weights thereof only vary within a predetermined range. And therefore, the preparation of the set of the coil units means that the necessary number of those elements is respectively picked out from the stratified groups.

At a step 520, as in the same manner to the outer cores 6B, metal pieces having the same outer configuration and central bore 5a to the inner core 6A are formed from the metal sheet by the press-forming process and a predetermined number of the metal pieces are laminated to form the inner core 6A. Then the rotating shaft 5 is press inserted into the central bore 5a of the inner core 6A.

At a step 530, the set of the coil units (the laminated outer cores 6B, the bobbins 9 and the windings 7) prepared at the step 510 are assembled to the inner core 6A.

In the above embodiment, the weights of the laminated outer cores 65B and the winding units are respectively measured and stratified into the several groups depending on the measured weights, variations of the weights are controlled within the predetermined ranges in each group at the steps 320 and 430, and the sets of the coil units (the laminated outer cores and the winding units), which are respectively picked out from the respective one groups, are prepared at the step 510. Accordingly, a certain number (6 in the embodiment) of the sets, the weights of which are controlled within the certain range, can be prepared to be assembled to the inner core 6A. As a result, even in the case that the inner core 6A, multiple outer cores 6B to be fixed to the inner core 6A, multiple bobbins 9 provided on the outer cores 6B and the windings 7 wound on the bobbins 9 are separately manufactured and assembled, the weight variations of the combined coil units (including the outer cores 6B, the bobbins 9 and the windings 7) can be made smaller. And since such combined coil units are assembled to the inner core 6A, a range of imbalance of the rotors 4 can be also made smaller, and thereby the necessity for equalization of the imbalances becomes almost zero.

Furthermore, the total weights of the outer cores 6B, the bobbins 9 and the windings 7 can be derived from the addition of the respective weights of the outer cores 6B, the bobbins 9 and the windings 7. And therefore, at the step 510, the combined coil units (the outer cores 6B, the bobbins 9 and the windings 7) may be stratified into several coil groups depending on such total weights of the combined coil units. Then, the necessary number (six) of the coil units picked out from the coil groups can be assembled to the inner core 6A. As a result, even in the case that the inner core 6A, multiple outer cores 6B, multiple bobbins 9 and the windings 7 are separately manufactured and assembled, the weight variations of the coil units forming the rotor 4 can be made to fall within a certain small range. And therefore, a range of imbalance of the rotors 4 can be likewise made smaller, and thereby the necessity for equalization of the imbalances becomes almost zero.

Furthermore, in the above embodiment, the necessary number of lamination of the outer cores, namely the length L of the laminated outer cores 6B is decided in accordance with the measured thickness of the metal sheet 61B at the press-forming step 311 of the first process 300. As a result, the laminated outer cores 6B have not only weights within the certain weight range but also lengths within a certain length range, which are closely related to magnetic resistances, so that imbalances to be caused by a displacement of the center of the mass as well as magnetic imbalances can be suppressed.

In the above embodiment, furthermore, the weights of the bobbins 9 and the windings 7 are measured as the total weights thereof, because the weights of the bobbins 9 with the windings 7 wound thereon are measured at one time. Accordingly, even when there are variations with respect to the weights of the windings 7, the bobbins 9 and the windings 7 are stratified as the total weights of the winding units. Namely, the weight variations of the windings 7 can be absorbed by the grouping of the winding units.

Figure 4:
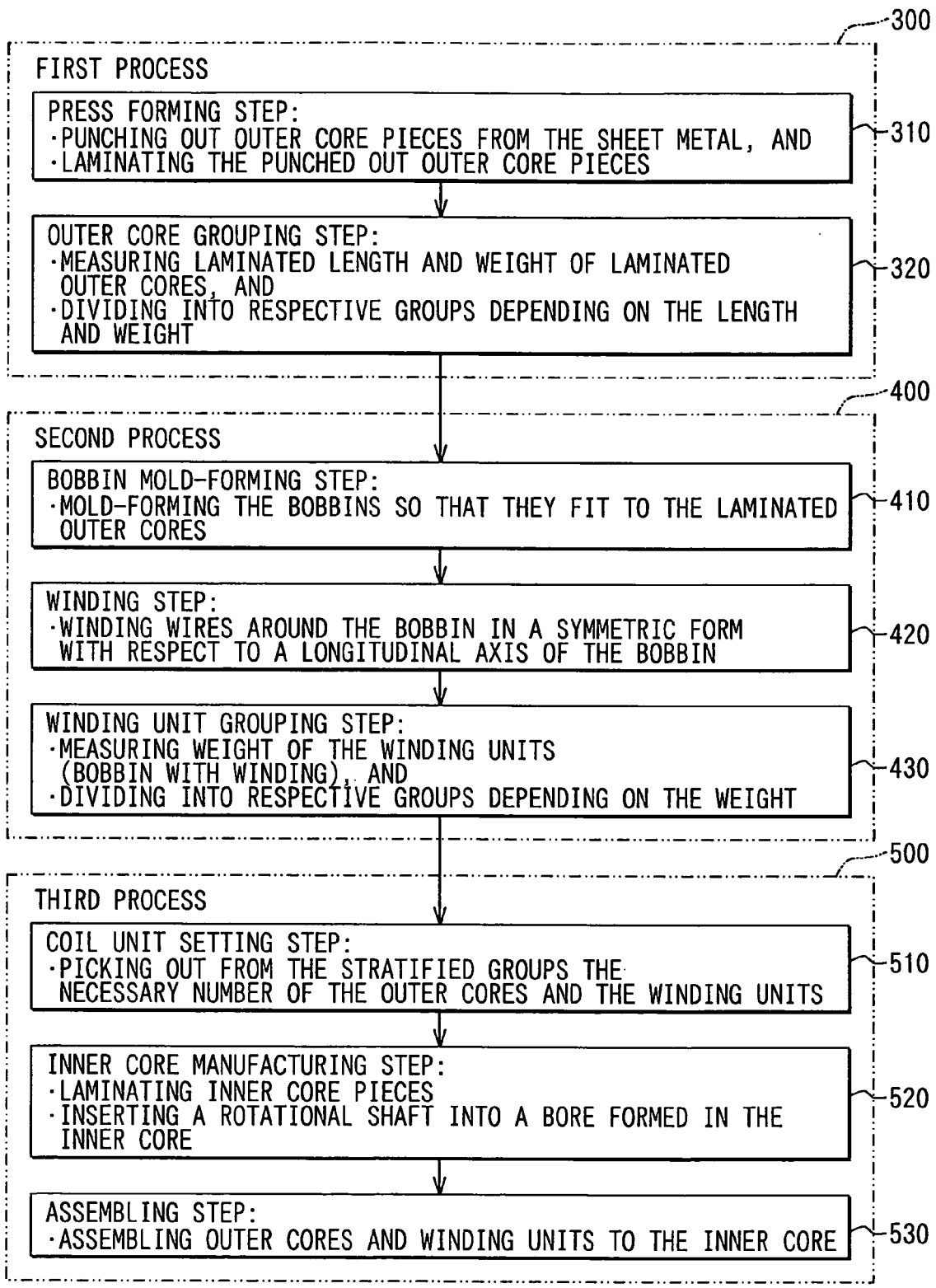
FIG. 4 is a process chart showing a process for manufacturing outer cores.
Figure 14:
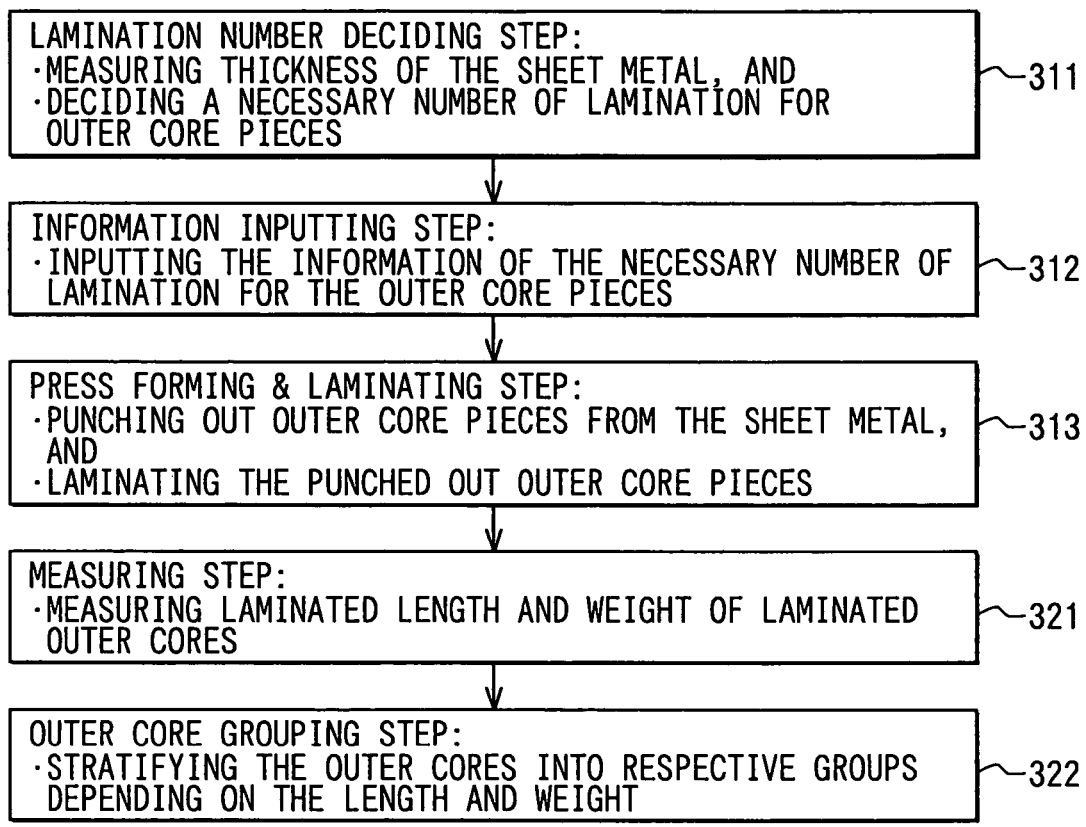
FIG. 14 is a process chart showing a modified process for manufacturing outer cores.

The first process (the press-forming step 310 and the outer core grouping step 320) in FIG. 4 can be replaced by the steps shown in FIG. 14.

At a step 311, the thickness of the metal sheet 61B for the outer core 6B is measured whenever the material (roll of metal sheet) is changed, and the necessary number of the lamination, namely the length of the laminated outer cores 65B will be decided.

When deciding the necessary number of the lamination, it should be preferable that the longitudinal length L of the laminated outer cores fall within a range of the standard dimensions, so that the length variations of the laminated outer cores are made smaller and variations of magnetic resistances at the outer cores for the magnetic poles can be likewise made smaller.

At a step 312, the information for the necessary number of the lamination, which is decided at the step 311, is input to the control unit 110a of the press-forming machine 110. The input of the information to the control unit 110a can be done directly by the worker 106, or can be made by means of a measuring device which is operated by the worker 106 or which automatically detects the thickness of the metal sheet.

At a step 313, the outer core pieces 64B are press-formed from the metal sheet 61B by the press-forming machine 110, the necessary number of the outer core pieces are laminated and picked up by the core laminating machine 150.

At a step 321, the laminated length and weight of the laminated outer cores 64B are measured, and at a step 322 those laminated outer cores 64B will be stratified into several groups depending on the measured lengths and the weights. Accordingly the length and weight of the laminated outer cores 64B in the respective groups are so controlled to fall within the respective weight ranges. As in the same manner in FIGS. 4 and 5, the outer cores may be stratified into three groups a, b and c.

In the above process, the steps 311, 312 and 313 constitute a press-forming step corresponding to the step 310, while the steps 321 and 322 constitute a outer core grouping step corresponding to the step 320 in FIG. 4.

(Second Embodiment)

Figure 15A:
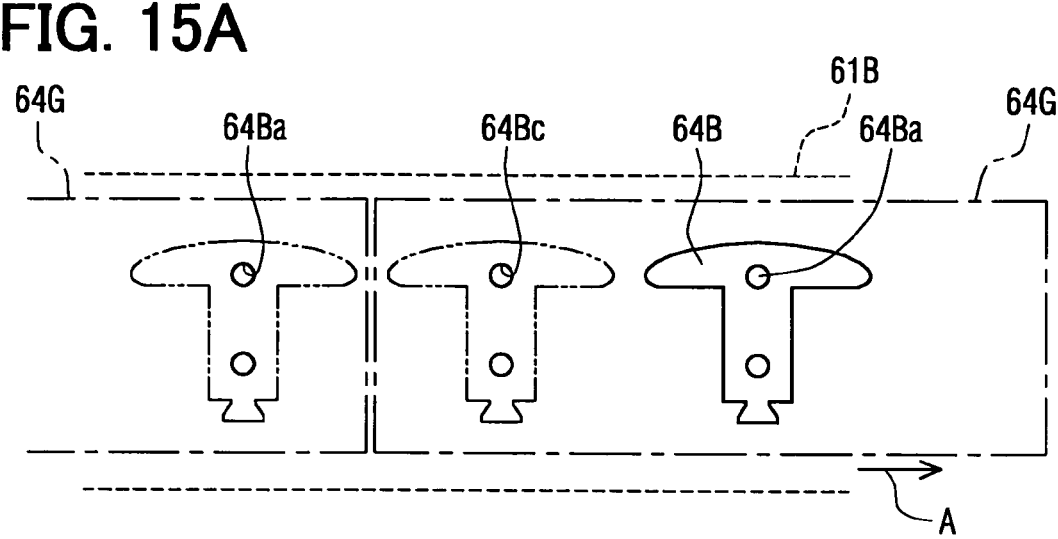
FIGS. 15A and 15B are a front and a side views showing a step for manufacturing outer core pieces according to a second embodiment of the present invention.
Figure 15B:
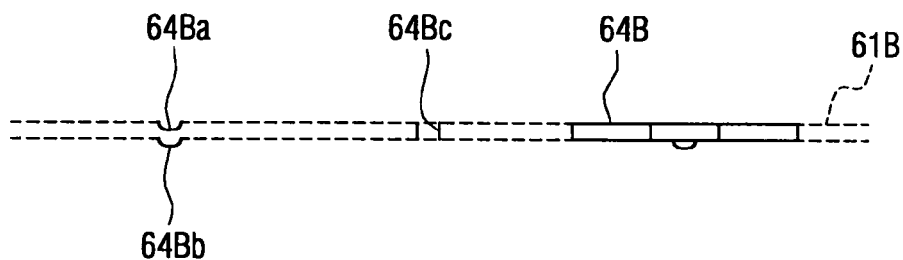

A second embodiment of the present invention will be explained with reference to FIGS. 15A and 15B, in which a step of press-forming the outer core pieces 64B is different from the corresponding steps of the first embodiment and the step of this embodiment can be adopted at the step 313 in FIG. 14. FIG. 15A is a front view showing the steps of forming the outer core pieces and FIG. 15B is a side view of FIG. 15A. In FIG. 15A, dotted lines show the metal sheet 61B which is passed on in a direction of an arrow A. The press-forming process of this embodiment comprises a first step of forming a concave 64Ba (a convex 64Bb on a back side) on the metal sheet 61B, a second step of forming a through-hole 64Bc at the concave 64Ba, and a third step of punching out the outer core piece 64B, wherein the second step of forming the through-hole 64Bc is carried out only at each end of one group 64G having the necessary number of the outer core pieces 64B which is determined by the thickness of the metal sheet 61B. Accordingly, each group 64G of punched out outer core pieces has one piece 64B with the through-hole 64Bc and a certain number of pieces 64B with the concave 64Ba (and convex 64Bb). After those pieces are punched out, they are laminated so that each convex 64Bb is fitted into the concave 64Ba of the adjacent outer core piece, except that the convex 64Bb of the second core piece from the end of the group 64G is fitted into the through-hole 64Bc of the last core piece 64B.

As understood from the above explanation, all of the core pieces 64B belonging to one group 64G are fitted together to form one unit of the laminated outer core 6B, whereas the last end core piece 64B is not fitted to the core piece of another group, since it has no convex at its back side.

It is possible to uniform the outer shape of the laminated outer core pieces 64B, by using the concave 64Ba, convex 64Bb and the through-hole 64Bc as reference positions. As a result, the outer shape of the connecting portions 6a of the outer core 6B is also uniformed and thereby the insertion of the outer core 6B to the inner core 6A can be precisely done, and furthermore, a displacement of the center of gravity which may be caused by an improper insertion of the outer core 6B to the inner core 6A is prevented.

Since the outer core pieces 64B are fitted together by the concave and convex (and the through-hole), it is not necessary to use adhesive material to fit together those outer core pieces. When the adhesive material is used, it should be applied to surfaces of the outer core pieces, so that the spread of the adhesive material becomes uniform over the surfaces to prevent the displacement of the center of gravity. However, since it is not necessary in this embodiment to use the adhesive material, the displacement of the center of gravity is prevented.

(Third Embodiment)

A third embodiment of the present invention is explained with reference to FIGS. 16 to 20. The third embodiment differs from the first embodiment in that the weight of the coil unit (the outer core 6B, the bobbin 9 and the winding 7) is measured and stratified into multiple groups, instead of the weight of the winding units (the bobbin 9 and the winding 7).

Figure 16:
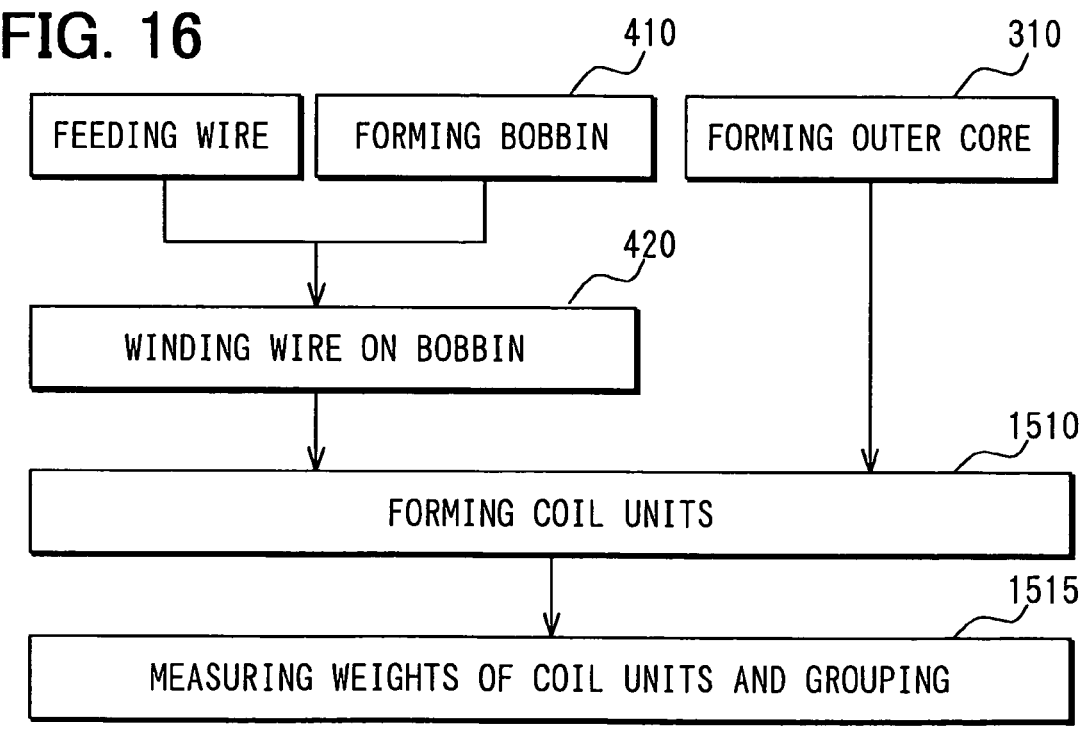
FIG. 16 is a process chart showing a process for manufacturing coil units in the second embodiment.

As shown in FIG. 16, the outer cores 6B are manufactured at the step 310, the bobbins 9 are formed by the resin-molding process at the step 410, and the winding 7 is wound on the bobbin 9 at the step 420, as in the same manner to the first embodiment. A step 1510 is the step for assembling and forming the coil unit 50 which comprises the outer core 6B, the bobbin 9 fixed to the outer core 6B and the winding 7 wound on the bobbin 9. And then the weight of the coil unit 50 is measured at a step 1515 and stratified into multiple groups depending on the weights.

Figure 17:
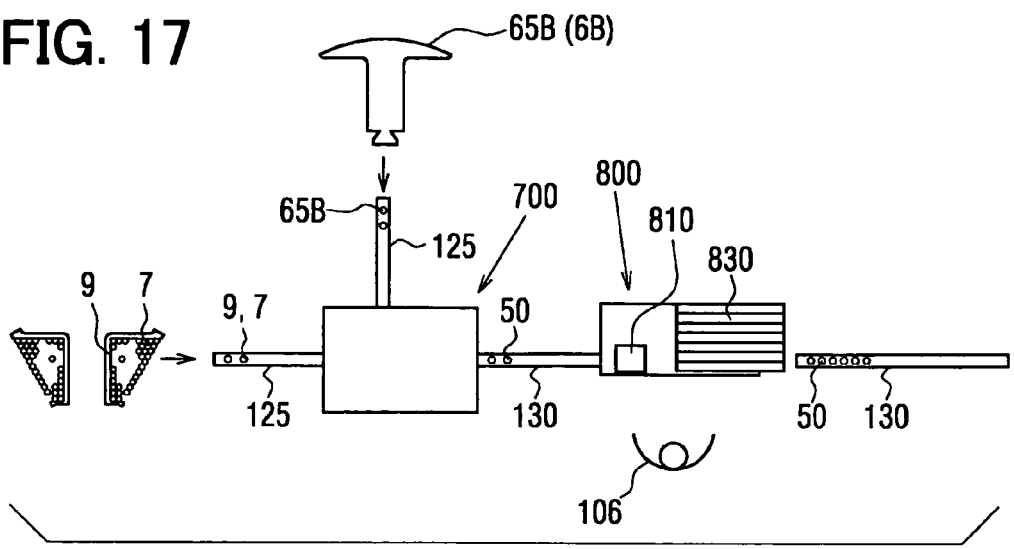
FIG. 17 is a schematic view showing a coil unit assembling machine and a coil unit stratifying apparatus.

As shown in FIG. 17, the laminated outer cores 65B and the bobbins 9 with the windings 7 are respectively fed to a coil unit assembling apparatus 700 where the outer core 65B is assembled to the bobbin 9 to form the coil unit 50. The weights of the coil units 50 are measured at a measuring apparatus 810 of a stratifying apparatus 800 and then divided into multiple groups by a grouping apparatus 830. In FIG. 16, a numeral 125 designates a work feeding machine, a numeral 130 designates the work transferring machine, and both of the machines 125 and 130 are composed of the well known belt conveyers. The work transferring machine 130 provided between the coil unit assembling apparatus 700 and the stratifying apparatus 800 has a function of carrying out the coil unit 50 from the assembling apparatus 700 and bringing the same in the stratifying apparatus 800.

Figure 18:
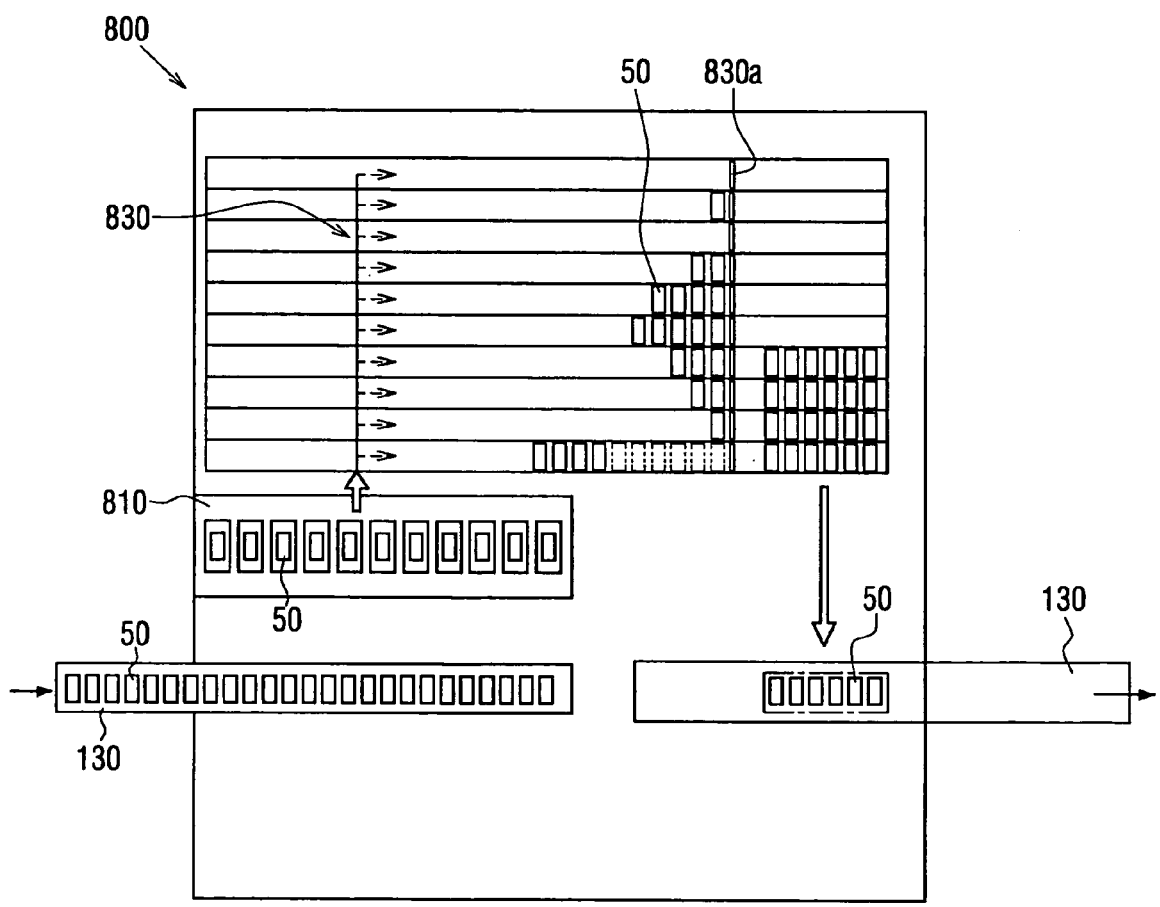
FIG. 18 is a schematic view showing an operation of the stratifying apparatus.

A schematic view of the stratifying apparatus 800 is shown in FIG. 18, in which the coil units 50 are brought in the apparatus 800 and the weights thereof are measured by the measuring apparatus 810, and then they are divided into the respective groups by the grouping apparatus 830 depending on the respective weights. In FIG. 18, there are shown ten groups in which the coil units in the respective groups are pooled as shown by dotted line arrows. The apparatus 830 has a belt conveyer and a gate 830a in each of the groups. The gate 830a will be opened when the pooled number of the coil units 50 in the respective groups reaches a predetermined number (six in this embodiment). At a downstream side of the apparatus 830, a storing space is provided, so that when multiple sets (one set consists of six coil units) of the coil units are carried out from the gates 830a, the sets of the coil units are temporarily stored at this space. And then the sets of the coil units are carried out from this space in a sequential or random order. In this embodiment, those coil units, the number of which does not reach a set number (six) in the respective groups, will be an intermediate stock, and it is prevented in the embodiment that the number of the intermediate stocks will be increased.

Figure 19A:
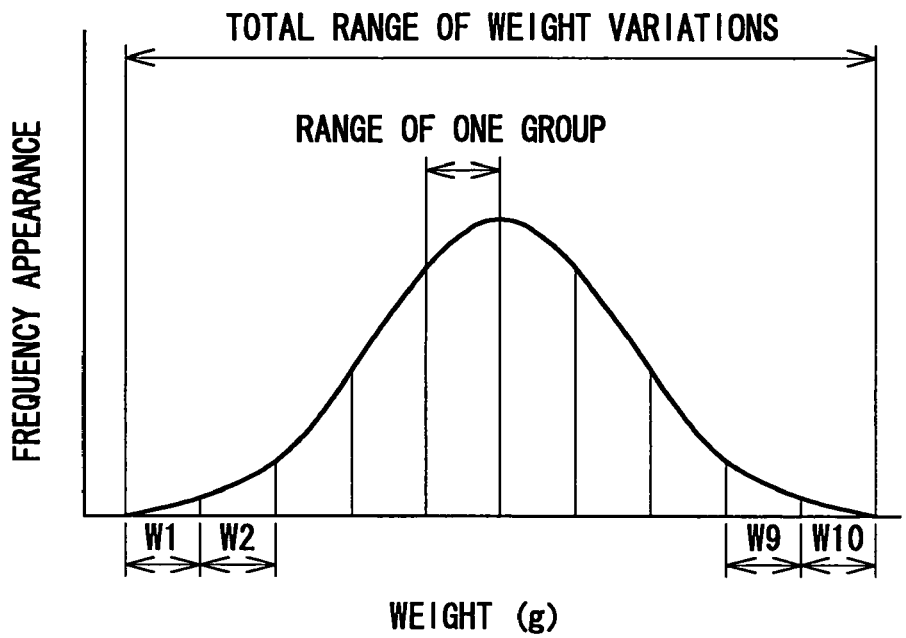

FIG. 19A shows a frequency distribution of the weights of the coil units, in which W1 to W10 designate ranges of weight variations for the respective groups. For example, in this embodiment, the ranges W1 to W10 are made equal to 12 mg.

Figure 19B:
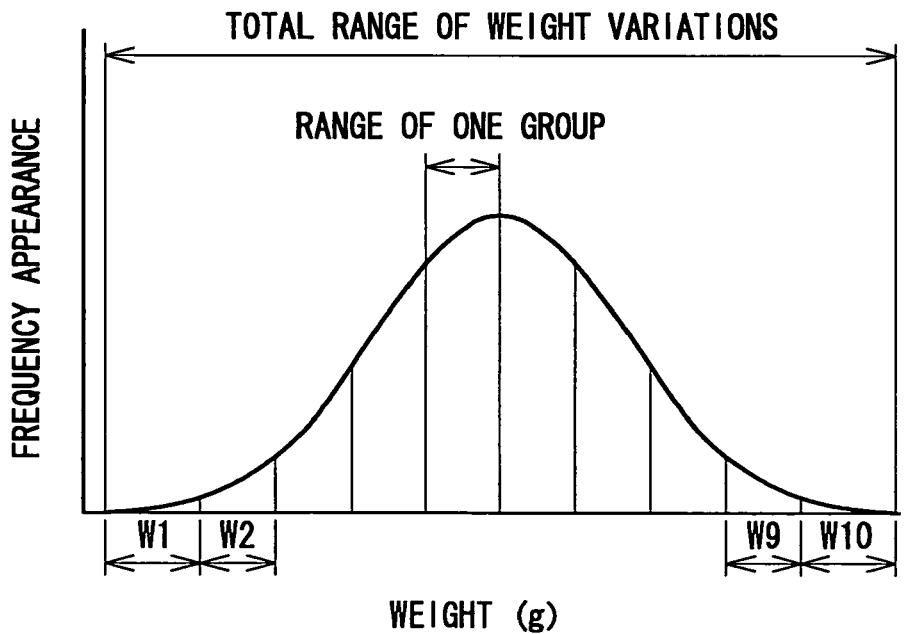

The ranges W1 to W10, however, may not be made equal to each other. As shown in FIG. 19B, weight variations of the coil units 50 show the normal distribution. Therefore, the frequency of appearance of the coil units 50 belonging to such groups which are close to the center of the normal distribution is higher than that of the coil units belonging to the groups at both sides of the normal distribution. As already explained, unless the number of coil units reaches the set number (six) in the respective groups, the coil units will not be carried out from the stratifying apparatus 800, causing a problem that those coil units maybe kept as the intermediate stocks. In view of this point, the ranges W1 to W10 can be made in such a way that the ranges W2 to W9 are made to be 10 mg while the ranges W1 and W10 at the both sides are made to be 20 mg. The total range of W1 to W10 is 120 mg, which is equal to the case in which the ranges W1 to W10 are made to be equal (12 mg) to each other. In this modification, since the ranges W2 to W9 are made smaller than the ranges W1 and W10, the displacement of the center of gravity for the rotor can be made further smaller, and therefore, the production volume of the rotors 4, for which adjustments for imbalances are not necessary, can be increased.

Figure 20:
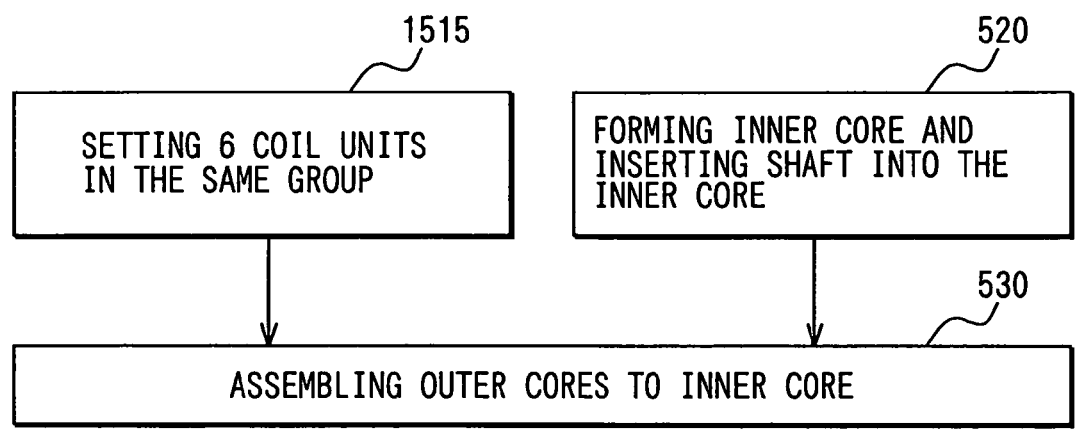
FIG. 20 a process chart showing a process for assembling coil units to an inner core.

In FIG. 20, the coil units 50 are stratified into the number of groups at the step 1515 and 6 coil units are made to one set. The one set of the coil units will be then assembled, at the step 530, to the inner core 6A prepared at the step 520 to finally form the rotor 4.

As explained in the above embodiment, since the coil units 50 (comprising the outer core 6B, the bobbin 9 and the winding 7) are stratified into number of groups depending on the weights thereof, the process for manufacturing the rotors 4 in this embodiment has a higher productivity than the process in which the weights of the outer cores 6B and the winding units (comprising the bobbin 9 and the winding 7) are separately measured and stratified into the groups, because number of the intermediate stocks of the outer cores 6B or the winding units can be reduced.

(Fourth Embodiment)

Figure 21:
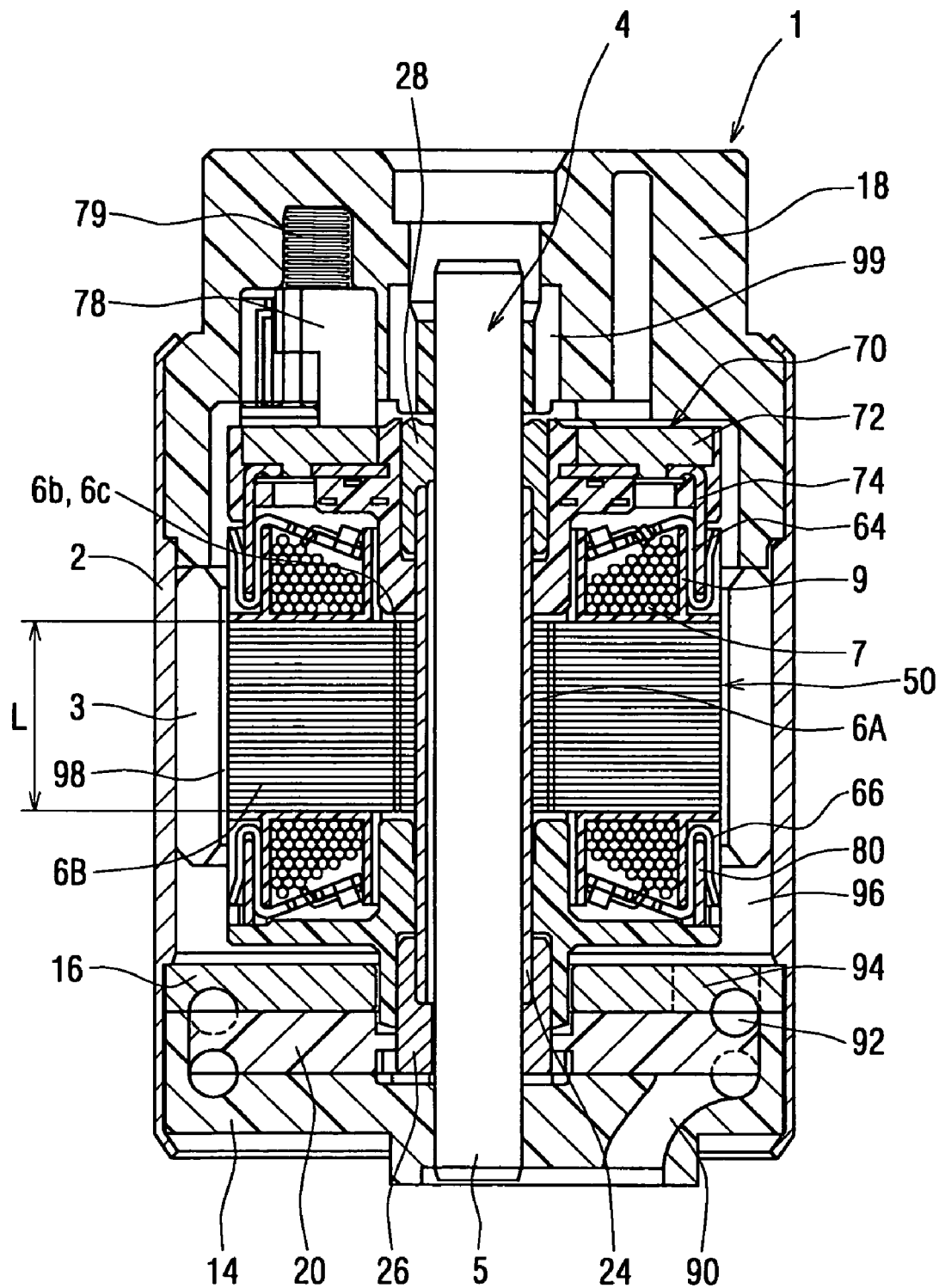
FIG. 21 is a cross-sectional view showing a fuel pump in which a rotor according to the present invention is used.

FIG. 21 shows a fuel pump 1, more particularly an in-tank type fuel pump installed within a fuel tank of a motor vehicle, to which the rotor 4 of the present invention is used.

In FIG. 21, a housing 2 has an inlet side cover 14 and an outlet side cover 18, which are fixed to the housing 2 by caulking or the like. A pump casing 16 is interposed between the inlet side and outlet side covers 14 and 18. A C-shape pump passage 92 is formed between the inlet side cover 14 and the pump casing 16 and an impeller 20 is rotationally disposed therebetween. Multiple blades and grooves are formed at outer peripheral surfaces of the impeller 20, so that when the impeller 20 is rotated pressure difference will appear at the blades and grooves due to fluid friction. The fuel in the pump passage 92 is thus pressurized by the rotation of the impeller 20. The fuel sucked into the pump passage 92 through an inlet port 90 formed in the inlet side cover 14 flows into a motor chamber 96 at a high pressure through the pump passage 92 and a port 94 formed in the pump casing 16. The pressurized fuel further flows through a fuel passage 98 formed between the housing 2 (permanent magnets 3) and the rotor 4 and through an outlet port 99 formed in the outlet side cover 18. The pumped out fuel will be finally supplied to an internal combustion engine.

A commutator 70 has 6 segments 72 arranged in a rotational direction. Multiple slits (not shown) are formed between the segments 72 and insulating material such as resin are embedded in spaces of the slits so that the segments 72 are electrically insulated from each other. Each of the segments 72 is electrically connected to terminals 74 as shown in FIG. 21. The terminals 74 are electrically connected to the respective terminals 64 of the rotor 4 (the coil units 50), wherein the terminal 64 has a U-shaped end to which one end of the terminal 74 is inserted. Each one end of the winding 7 of the coil units 50 is electrically connected to the terminal 64, while the other end of the winding is electrically connected to a terminal 66. There are three terminals 66 which are closely arranged in the rotational direction which are electrically connected to each other by means of a terminal 80, so that a neutral point of the star-connected windings is formed by the terminal 80. A brush 78 is urged towards the commutator 70, namely to the segments 72 by a spring 79. Electric power will be supplied to the windings through the brush 78, the segments 72, the terminal 74 and the terminal 64. The commutator 70 is fixed to a side portion of the bobbins 9 so that it is directly or indirectly positioned to the rotating shaft 5 in its longitudinal direction.

The inner core 6A is supported by a pipe 24 which is rotationally held by the shaft 5. The shaft 5 is supported by the inlet side and outlet side covers 14 and 18. A pair of bearings 26 and 28 is rotationally supporting the pipe 24 and the coil units 50. Even in this embodiment, imbalance of the rotor can be reduced so that necessity of the adjustment of the imbalance is almost zero.

When the imbalance of the rotor is adjusted, a portion of the outer periphery of the rotor is cut away. When the cut-away portion becomes larger, the fuel flow in the fuel passage 94 will be disturbed, causing a fuel pressure pulsation at the pressurized fuel from the fuel pump 1.

According to the present invention, the imbalance adjustment is almost unnecessary and even in case of the adjustment a small adjustment is enough to remove the imbalance.

As a result, when the rotor of the present invention is used for the fuel pump, the fuel pressure pulsation can be suppressed.

When a portion of the rotor will be cut away to adjust the imbalance of the rotor, at least one of the outer cores and the bobbins shall be the element to which the adjustment will be made. When the adjustment is made to the outer core, a magnetic imbalance may be caused. Therefore, the bobbins may be preferable for the adjustment. According to the present invention, however, the imbalance adjustment is almost unnecessary and even in case of the adjustment a small adjustment is enough to remove the imbalance. And thereby the volume of the bobbin 9, for which the adjustment will be made, can be smaller. Namely, the rotor 4 of a small size can be obtained keeping a good magnetic property.

In the case that the imbalance adjustment will be made to the outer cores 6B, the outer cores 6B may happen to be displaced from the original positions due to excessive external force. For example, one or several sheets (outer core pieces) of the outer core 6B will be deformed, or a space between the laminated sheets will be enlarged. When it happens, the bobbins 9 may be displaced to cause a problem of electrical disconnection between the terminals 64 and 74. Furthermore, since the commutator 70 is fixed to the side portion of the rotor 4, the commutator 70 may be inclined against the shaft 5 when the bobbin 9 is displaced. When it happens, the electrical contact between the brush 78 and the segments 72 may be adversely affected, causing electrical disconnection therebetween. According to the present invention, however, since the imbalance adjustment is almost unnecessary and even in case of the adjustment a small adjustment is enough to remove the imbalance, it is prevented that the excessive external force may be applied to the outer cores 6B and the displacement of the bobbin 9 is prevented so that the inclination of the commutator 70 is prevented. Furthermore, electrical disconnection between the rotor 4, the commutator 70 and the brush 78 is prevented.

(Other Embodiments)

In the above embodiments, either the coil units (the outer core 6B, the bobbin 9 and the winding 7) or the winding units (the bobbin 9 and the winding 7) and the outer core 6B are stratified into several groups by their weights. It is, however, also possible to stratify at least one of the outer cores 6B, bobbins 9 and the windings 7 into several groups by their weights.

According to the embodiments above described, the adhesive material is not necessary for forming the laminated outer cores 65B. Therefore, it is possible to estimate the weights of the laminated outer cores 65B based on the information for the thickness of the outer core pieces (metal sheet) and the number of the outer core pieces to be laminated. Accordingly, instead of grouping the laminated outer cores by measuring the weight of each outer core, it is possible to stratify into several groups based on the number of lamination of the outer cores. In this modified embodiment, the six outer cores having the same number of the lamination will be fixed to the inner core 6A, namely the outer cores 6B having the almost same weights are fixed to the inner core 6A.

In stead of estimating the weight of the laminated outer core from the number of the lamination, it is also possible to estimate the weight of the laminated outer core from the length thereof.

Any methods of manufacturing the rotor according to any embodiments above described can be used to the rotor for the fuel pump.

The ranges of the stratifying groups for the coil units 50 are explained to be equal to each other or to be two different ranges with reference to FIGS. 19A and 19B. It is, however, further possible to make the ranges of the stratifying groups wider and wider in a stepwise manner from the center of the normal distribution to the outer area, or to make the ranges to be inverse proportion to the frequency of appearance. When the range of the groups will be enlarged, it is, of course, important to make the range of the groups in such a way that the rotor assembled by the outer cores, bobbins and windings respectively picked out from the same groups has imbalance within an acceptable values.

It is furthermore possible to form the bobbin by an insert-molding process so that the outer core 6B and the bobbin 9 will be manufactured at the same time, instead of separately manufacturing the outer core and the bobbin and assembling them later.

What is claimed is:

1. A method of manufacturing a rotor of an electric motor having a motor housing, a rotating shaft rotationally supported by the motor housing, and a rotor supported by the rotating shaft, wherein the rotor comprises an inner core fixed to the rotating shaft, and a coil unit having multiple outer cores, bobbins provided on the outer cores and windings respectively wound on the bobbins, wherein the method comprises;
    a step of forming outer core pieces from metal sheet;
    a step of measuring a thickness of the metal sheet and deciding a number of lamination of outer core pieces;
    a step of laminating the decided number of outer core pieces to form the outer core;
    a step of measuring weight of the outer cores;
    a step of stratifying the outer cores into a predetermined number of outer core groups, wherein each of the groups has a weight range;
    a step of forming a winding unit, wherein the winding is formed on the bobbin;
    a step of measuring weight of the winding units;
    a step of stratifying the winding units into a predetermined number of winding unit groups, wherein each of the groups has a weight range;
    a step of preparing a set of coil units, which has a certain number of outer cores and winding units, wherein the outer cores and winding units are respectively picked out from one of the outer core groups and one of the winding unit groups; and
    a step of assembling the set of coils unit to the inner core.

2. The method of manufacturing a rotor according to claim 1, wherein a width of the weight range of a group is made larger than that of the weight range of the other groups.

3. The method of manufacturing a rotor according to claim 1, wherein a width of the weight range of the groups at both ends of a normal distribution is made larger than that of the weight range of the groups close to a center of the normal distribution.

* * * * *